United States Patent Office 3,063,891
Patented Nov. 13, 1962

3,063,891
METHOD OF ADHERING A FLEXIBLE PROTECTIVE SHEET TO A RIGID SURFACE IN WHICH A DIFFERENT COATING IS ON THE TWO MATING SURFACES
William H. Boylan, North Haven, and William J. O'Brien, Hamden, Conn., assignors to The Seamless Rubber Company, New Haven, Conn., a corporation of Connecticut
No Drawing. Filed Apr. 21, 1958, Ser. No. 729,527
4 Claims. (Cl. 156—310)

This invention is concerned with novel compositions used for the coating of surfaces, with novel processes for their use, and with the novel coated products. In particular, it is concerned with the application of protective coatings to rigid surfaces by means of adhesive materials.

The compositions and processes of the present invention may be used for the protection, insulating and/or strengthening of a variety of rigid surfaces, for example, various types of ceramic material, wood, plastic surfaces and other surfaces susceptible to deterioration. The invention is of particular importance with regard to metallic surfaces which are subject to corrosion or which must be insulated. The protection of pipes and tubes is one of the main objects of the present invention. Oil and gas pipe lines, for example, must be protected from corrosion, from the effects of the elements including heat, light, sun, rain, blowing sand, and from abrasion with terrain. To illustrate the invention, protection of a metallic pipe will be spoken of as an example, although it is to be understood that other surfaces, particularly other metallic surfaces such as that of storage tanks, may also be treated by the present invention.

In the process of the invention, the surface to be protected, for example iron or steel pipe, is first covered with a prime coating. The prime coating is allowed to dry, and then a flexible backing web or carrier element which has an adhesive on its surface is applied to the primed surface to be protected.

The present invention involves several important aspects. One is that a prime coating composition is applied, in the "hot melt" state or in a suitable liquid carrier, to the surface of the pipe in the manner of paint, varnish or lacquer. The prime coating serves several purposes. When used on metal, it will inhibit moisture from contact with the surface and thereby prevent corrosion. In addition, the prime coating contains a mixture of a catalyst for vulcanization and a catalyst for polymerization of resins. The prime coat also serves as a cavitation control by smoothing out pitted surface areas, thus preparing a more even surface for contact with the adhesive coated backing.

Another feature of the invention is the use of a flexible backing or carrier element of a sheeting material the surface of which contains an adhesive coating on one or both sides. The adhesive element is applied to and pressed down firmly on the primed surface. The adhesive element comprises unvulcanized or incompletely vulcanized rubber, either natural or synthetic or a mixture, unpolymerized or incompletely polymerized resin and sulfur. As a result of contacting the adhesive element with the primed surface, chemical reactions take place which cause the adhesive to "set" in a reasonably short period of time, the flexible backing element thereby becoming securely attached to the surface being protected. During the process of setting, the originally soft and yielding materials of the prime coating and the adhesive mass are converted into a tough, resistant, unified system through cross-linking, curing and vulcanization. The result is a moisture-proof, tightly adhering protective coating. Pipes coated according to the present invention, in a much better manner than pipes coated by prior art methods, are able to withstand the abuses to which they are subjected. The invention also affords an improved means for adhering insulation to moving metal parts of electrical equipment where centrifugal force tends to cause the insulation to slip.

A particular advantage of the present invention is that it requires relatively low temperatures and relatively short periods of time to effect a cure.

Polyethylene sheeting is an example of a preferred material to be used as the flexible backing or carrier element. Other types of equivalent backing material may also be employed, for example, polypropylene, polyvinyl chloride, and similar plastic material. The polyethylene surface is preferably oxidized prior to the application of the adhesive mass, for example by the use of ozone formed at the surface by electrical discharge. Such procedures for oxidizing the surface are well known in the art, and are discussed in U.S. Patent No. 2,810,-933 for example. Oxidation of the surface creates increased adhesion. Other methods for bonding the adhesive such as chemical etching and flash flame treatment may also be used.

The requirements of the backing material are that it be flexible and impenetrable and have sufficient toughness to protect the underlying pipe surface from the elements. When used for electrical insulation, the backing material should have good insulating properties. In addition, the backing material should be insoluble in water and oil. Resistance to attack by oil is of particular importance when the pipe is used underground in oil refineries where considerable oil has generally been released on top of the ground. This oil gradually seeps into the ground and causes an adverse effect upon conventional pipe coatings such as mastic or hot melt coatings and plastic back tapes. The oil seeps into previously known coating materials and unites with the resin. The coating thus loses its adhesion and slides over the surface it should be protecting.

The primer material is applied to the surface to be protected in the manner of paint, varnish or lacquer. This prime coating comprises a vulcanization accelerator and a polymerization activator. Preferably it also contains an uncured oil resistant synthetic rubber which upon contact with the adhesive mass becomes cured and is thereby rendered more oil and solvent resistant. Nitrile-butadiene rubber such as Pliobond (a combination of nitrile-butadiene rubber and phenolic resin) is preferred. Chloroprene rubber such as neoprene GN is also suitable, as are such asphalt based resinous primes as Prime 70B (Koppers), Prime 23A (Reilly Tar and Chemical Co.), and Prime AA (Barrett Division of Allied Chemical & Dye Corp.).

There are many known types of vulcanization accelerators and polymerization catalysts which may be used in the prime coating. Useful materials include derivatives of dithiocarbamate such as piperadinedimethyl-aminedithiocarbamate, zinc diethyldithiocarbamate and zinc dibutyldithiocarbamate, tributylideneaniline, formaldehydemonoethylamine, and heptaldehyde-aniline. Preferred ingredients include piperadinepentamethylenedithiocarbamate and tetramethylenethiuramdisulfide. Tetramethylenethiuramdisulfide is a particularly preferred ingredient because it is also an anti-mold agent and fungicide, and it maintains such activity when used in the present process. Other useful vulcanization accelerators include diphenylguanidine, diorthotolylguanidine, 2-mercaptobenzothiazole and zinc benzothiazyl sulfide. Dibutylammonium oleate and heat reactive phenolic resin may be used to activate resin polymerization.

The adhesive mass comprises incompletely vulcanized rubber, incompletely polymerized resin, and sulfur. Such materials as natural rubber, neoprene (chloroprene), Hycar (butadiene-acrylonitrile), Butyl rubber (a copolymer of isoprene and butadiene) and reclaim rubber can be used in the adhesive element. It also may comprise optional ingredients such as fillers and pigments. When they are brought in contact, the prime coating and the adhesive mass react to form a unified, tough, single elastic system, cured together as an insoluble unit. The protective coating is thus securely adhered to the metallic surface.

Vulcanization of the incompletely vulcanized rubber is an important part of the setting process, and sulfur is therefore present. The sulfur may be present in the adhesive mass or in the prime coat. It is preferred that the sulfur be in the adhesive mass, which usually has a larger volume than the thin prime coat. When sulfur is used in the prime formula, the vulcanization initiator is in the adhesive mass. The ingredients of the prime coat and the adhesive mass complement each other so that upon contact, incompletely vulcanized rubber, sulfur and a vulcanization initiator are present in the mixture, along with an incompletely polymerized resin and a catalyst for the polymerization of the resin.

The resin is preferably of the soluble phenol-formaldehyde type, but urea-formaldehyde and Melamine type resins are also useful. It is desirable that the resin react to some extent with the hydrocarbon polymers in the mixture, thereby giving additional binding to the unit. The choice of catalyst for polymerization of the resin is determined by the particular type of resin being employed, the selection being obvious to those skilled in the art. The application of heat will in general act to increase the rate of polymerization.

In the table below, eight representative examples of the composition of the adhesive mass are given, and three representative examples of the composition of the prime coating are also given:

*Adhesive Mass*

|  | A, lbs. | B, lbs. | C, lbs. | D, lbs. | E, lbs. |
|---|---|---|---|---|---|
| #1 Smoked Sheet Rubber | 8 | 15 | 38 | 8 | 30 |
| Carcass Reclaim Rubber | 30 | 23 |  |  |  |
| Polyisobutylene |  |  |  | 30 | 8 |
| Zinc Oxide | 25 | 35 | 2 | 2 | 2 |
| Aluminum Hydrate |  |  | 20 | 20 | 20 |
| Hydrogenated Rosin | 35 | 25 | 30 | 30 | 30 |
| Carbon Black | 2 | 2 | 2 | 2 | 2 |
| Lanolin | 2 | 2 | 2 | 2 | 2 |
| Sulfur | 0.5 | 1 | 0.75 | 0.75 | 0.75 |
| Phenolic Resin SP-12 | 5 | 15 | 10 | 10 | 10 |
|  | 107.5 | 118 | 104.75 | 104.75 | 104.75 |

|  | F, lbs. | G, lbs. | H, lbs. |
|---|---|---|---|
| #1 Smoked Sheet Rubber | 8 | 8 | 8 |
| Neoprene Type W | 30 |  |  |
| HyCar (butadiene-acrylonitrile) |  | 30 |  |
| Butyl Rubber Type 215 |  |  | 30 |
| Zinc Oxide | 2 | 2 | 2 |
| Aluminum Hydrate | 20 | 20 | 20 |
| Hydrogenated Rosin | 30 | 30 | 30 |
| Carbon Black | 2 | 2 | 2 |
| Lanolin | 2 | 2 | 2 |
| Sulfur | 0.75 | 0.75 | 0.75 |
| Phenolic Resin SP-12 | 10 | 10 | 10 |
|  | 104.75 | 104.75 | 104.75 |

|  | I, lbs. |
|---|---|
| Butyl Rubber Type 215 | 38 |
| Zinc Oxide | 2 |
| Aluminum Hydrate | 20 |
| Hydrogenated Rosin | 5 |
| Carbon Black | 2 |
| Lanolin | 2 |
| Sulfur | 1 |
| Phenolic Resin SP-12 | 10 |
|  | 80 |

*Prime Coating*

|  | A, ozs. | B, ozs. | C, ozs. |
|---|---|---|---|
| Nitrile-Butadiene Rubber | 100 | 100 | 100 |
| Piperadienepentamethylenedithiocarbamate | 10 | 10 | 5 |
| Tetramethylenethiuramdisulfide | 5 | 5 | 10 |
| Butyl 8 |  | 15 | 5 |
|  | 115 | 130 | 120 |
| Methyl ethyl ketone gals | 2 | 2 | 2 |

In the above table, phenolic resin SP-12 is an oil soluble, heat reactive, unmodified 100% phenol-formaldehyde resin. Butyl 8 is a dithiocarbamate type accelerator. Carcass reclaim is reclaimed rubber which has been taken from the carcass or side walls of tires and reworked into a reusable form. Butyl rubber type 215 is a 97% butadiene-3% isoprene rubber from the Enjay Company.

Considerable variation in the composition is possible as shown by the above table. Adhesive mass Examples "C," "D" and "E" have one-fifth the water absorption of Examples "A" and "B." This difference is due to use of aluminum hydrate in place of zinc oxide, and to the elimination of reclaim rubber. The minimization of water absorption is particularly desirable in those cases where excessive moisture can be an important factor in corrosion control.

The adhesive mass from Examples "A" and "B" has a degree of "cold flow" different from that of Example "C." "A" has the least flow, "B" the next and "C" the most. Examples "D" and "E" have a cold flow in between "A" and "B." "Cold flow" is the degree to which the adhesive conforms and flows around the elevations or depressions in the surface including depressions which the prime coat has failed to fill. Under constant strain, adhesive "A" slips the least, while "C" will slip the most. These slippages are in all cases very small and in some cases are not important, but in other cases they are of great importance. Certain surfaces can use composition "A" without difficulty, while other surfaces will require "C" or the intermediate cold flow adhesives.

In the industrial use of the term, an adhesive is considered to be pressure sensitive when a force of at least 14 ounces is required to peel back a one inch wide strip from a stainless steel surface to which it has been pressed. The adhesive composition from "A" through "H" inclusive given above meet this definition, and require a force of from about 30 to 40 ounces. Adhesive mass "I" above is of the low tack type, and requires a force of from about 8 to 10 ounces. All the compositions, however, are tacky enough so that they may be used on backing in roll form without unraveling. At the same time, they can be peeled back easily enough so that they may be used with automatic dispensing machinery in the actual pipe wrapping operation.

In regard to the prime coating compositions, Example "A" is the slowest curing of the group. The composition of Example "A" will cross-link the above adhesives and cure them in about three weeks at room temperature, while primes "B" and "C" do the same job in about twelve days at room temperature. All primes will cure the adhesive-prime system in about four hours at 150° F. It is therefore often desirable to bring about a more rapid cure by the application of heat. In the case of pipe which has been wrapped with the protective coating, curing can be accomplished simply by convecting heat through the pipe. Another means of accelerating cure is radiant heat, for example exposing the coated pipe to sunlight.

The performance of the adhesive mass is greatly improved by the presence of certain additional materials. Zinc oxide is useful as a filler and as an activator of vulcanization. Aluminum hydrate is a filler pigment having the advantage of low water absorption. Hydrogenated rosin acts as a tackifying agent in the adhesive. Carbon black acts as a reinforcing, ultra-violet inhibiting pigment. Lanolin is a lubricant, and acts with the hydrogenated rosin to aid in the tackification. The use of the above and similar materials will be obvious to those skilled in the art.

It is preferred that the prime coating comprise an oil resistant synthetic rubber which, when cured upon contact with the adhesive mass, becomes more oil and solvent resistant. It is, however, possible to use the vulcanization initiators and polymerization activators in any of the well known primers now used in coating pipe and metal. Such primers are for the most part based on asphaltic substances, although practically any resin or combination thereof may be used. The oil resistant synthetic rubber material is preferred because of its oil resistance and elasticity, and also because it has the ability to transmit the activators into the adhesive mass faster than if the activators were in resinous primes. It should be pointed out that cross-linking takes place because there is a penetration of the activators into the adhesive mass and a counter penetration of the sulfur from the adhesive mass into the prime coat. In this way, the necessary activating ingredients reach large volume surfaces in the amount necessary to complement the other ingredients already there and a cross-linking cure results.

The ability of the oil resistant synthetic rubber to transmit rapidly the activators from the prime coat into the adhesive mass is a very desirable advantage. When pipe is wrapped in a spiral fashion, or when the backing is applied as shingles, there is a certain amount of overlapping where there is no prime layer immediately below the adhesive mass. There is, however, sufficient lateral transmission of the activators so that the adhesive mass in the overlapping areas becomes vulcanized and polymerized into a tough unit.

Various solvents may be employed for the prime coat. Methyl ethyl ketone and methyl isobutyl ketone are especially useful for nitrile-butadiene based primes. Toluene is the preferred solvent with neoprene. Resin primes can be applied in a "hot melt" state and they can also be applied with toluene as a solvent or in another suitable vehicle.

The process of the present invention may be illustrated by the following, using a metallic pipe as an example of a rigid surface to be protected. The prime coat is compounded by mixing the accelerators into the synthetic rubber on a two-roll rubber mill or Banbury mill and then dissolving the mixture in a suitable solvent. The primer is applied to the pipe by spray, dip or brush so that a uniform, continuous protective film results. The adhesive mass is prepared by placing the natural rubber and reclaimed rubber on a two-roll rubber mill or Banbury mill and milling in the other ingredients in the following order: zinc oxide, aluminum hydrate, hydrogenated rosin, carbon black, lanolin and phenolic resin SP–12. The temperature of the adhesive mass should not be permitted to exceed 280° F. at any time during the mixing process. The adhesive mass is then applied to the oxidized surface of a sheet of polyethylene. When the prime coat on the pipe is dried, the adhesive coated tape is carefully wound in a spiral fashion or shingled on the surface of the pipe so that the adhesive mass contacts the primer. The application of mild heating under 150° F. will cause curing to take place, and the structure become a tough, unified mass. Curing can also be accomplished at room temperature over a period of several weeks or less. It is important that the adhesive be carefully applied to the prime in order to avoid pinholes and blisters. It is also important that intimate contact be achieved between the adhesive and the prime so that uniform cross-linking and polymerization can take place.

The foregoing examples are given solely for purposes of illustration and are not to be considered as limiting the invention to these embodiments. Many modifications will be apparent to those skilled in the art without departing from the spirit or scope of the invention.

What is claimed is:

1. A process for adhering a flexible protective sheet to a rigid surface which comprises coating the rigid surface with a prime coating comprising a vulcanization initiator and a catalyst for the polymerization of phenolic resin, coating the flexible protective sheet with a pressure sensitive adhesive mass comprising incompletely vulcanized rubber, incompletely polymerized phenolic resin and sulfur, and then applying the coated sheet to the prime coated rigid surface.

2. A process for the protection of metallic pipe which comprises coating the surface of the pipe with a composition comprising a vulcanization initiator and a catalyst for the polymerization of phenolic resin, and then applying to the coated surface of said pipe a pressure sensitive adhesive mass comprising incompletely vulcanized rubber, incompletely polymerized phenolic resin and sulfur, said adhesive mass being attached to the surface of a tough, flexible carrier element which is insoluble in oil and insoluble in water.

3. A process for the protection of the surface of a metallic pipe, said process comprising applying to the surface of the pipe a prime coating comprising an oil insoluble synthetic rubber, piperadinepentamethylenedithiocarbamate and tetramethylenethiuramdisulfide, applying to an oxidized polyethylene surface a pressure sensitive adhesive mass comprising incompletely vulcanized rubber, incompletely polymerized phenolic resin and sulfur, and contacting said adhesive mass to the prime coated surface of the pipe.

4. A process as claimed in claim 3 in which setting of the adhesive is promoted by convecting heat through the pipe.

References Cited in the file of this patent

UNITED STATES PATENTS

| | | |
|---|---|---|
| 1,434,892 | Harrison | Nov. 7, 1922 |
| 2,161,036 | Gremmel et al. | June 6, 1939 |
| 2,459,739 | Groten | Jan. 18, 1949 |
| 2,581,926 | Groten | Jan. 8, 1952 |
| 2,622,056 | DeCoudres et al. | Dec. 16, 1952 |
| 2,656,297 | Davis | Oct. 20, 1953 |
| 2,662,869 | Bloch | Dec. 15, 1953 |
| 2,673,826 | Ness | Mar. 30, 1954 |
| 2,691,614 | Wilson | Oct. 12, 1954 |
| 2,817,620 | Golick et al. | Dec. 24, 1957 |